United States Patent
Kim

(10) Patent No.: US 8,356,550 B2
(45) Date of Patent: Jan. 22, 2013

(54) PISTON SKIRT WITH FRICTION REDUCING OIL RECESS AND OIL RESERVOIR

(75) Inventor: Kwangsoo Kim, Canton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 866 days.

(21) Appl. No.: 12/500,291

(22) Filed: Jul. 9, 2009

(65) Prior Publication Data

US 2010/0018388 A1   Jan. 28, 2010

Related U.S. Application Data

(60) Provisional application No. 61/083,768, filed on Jul. 25, 2008, provisional application No. 61/098,912, filed on Sep. 22, 2008.

(51) Int. Cl.
*F01B 31/10* (2006.01)
*F16J 1/04* (2006.01)

(52) U.S. Cl. ............................. 92/159; 92/208
(58) Field of Classification Search .................. 92/158, 92/159, 174, 208
See application file for complete search history.

(56) References Cited

U.S. PATENT DOCUMENTS

| | | | |
|---|---|---|---|
| 1,413,791 A | 4/1922 | Schultz | |
| 1,462,501 A | 7/1923 | Barwald | |
| 1,760,122 A | 5/1930 | Drevitson | |
| 2,381,065 A | 8/1945 | Lieberherr | |
| 2,407,440 A | 9/1946 | Osborne | |
| 3,521,531 A | 7/1970 | Kaesemodel | |
| 4,280,455 A * | 7/1981 | Yamaguchi et al. | 123/196 M |
| 4,508,019 A | 4/1985 | Kabele | |
| 4,599,935 A | 7/1986 | Ellermann | |
| 4,760,771 A * | 8/1988 | Felici et al. | 92/159 |
| 4,809,591 A * | 3/1989 | Rhodes et al. | 92/159 |
| 4,809,652 A * | 3/1989 | Essig et al. | 92/208 |
| 4,903,580 A * | 2/1990 | Bruni | 92/158 |
| 5,076,226 A | 12/1991 | Watanabe | |
| 5,172,626 A * | 12/1992 | Hart | 92/177 |
| RE35,551 E | 7/1997 | Bruni | |
| 2002/0046648 A1 | 4/2002 | Gamble | |
| 2004/0237775 A1 | 12/2004 | Dunaevski et al. | |
| 2008/0148933 A1 | 6/2008 | Fisher et al. | |

FOREIGN PATENT DOCUMENTS

| | | |
|---|---|---|
| DE | 4209827 | 9/1993 |
| JP | 2002-174141 A | 6/2002 |
| WO | WO 86/03815 | 7/1986 |

* cited by examiner

*Primary Examiner* — Thomas E Lazo
(74) *Attorney, Agent, or Firm* — Robert L. Stearns; Dickinson Wright, PLLC

(57) ABSTRACT

A piston (20) includes a piston skirt (30) extending along a longitudinal axis (L) and having a pair of convex outer surfaces (42) facing opposite one another. Each of the outer surfaces (42) include an oil reservoir (44) above the pin bore axis (P) and an oil recess (46) below the pin bore axis (P) and spaced from the oil reservoir (44) by an intervening oil spreading area (48). The oil reservoir (44) and oil recess (46) each include a bottom (50) extending over an area of the outer surface (42) and surrounded by ramped side walls (52). The oil recess (46) and oil reservoir (44) include radiused corners (54) at a transition between the outer surface (42) and at the bottoms (50), so that the oil reservoir (44), oil recess (46), and outer surface (42) are free of sharp edges.

19 Claims, 5 Drawing Sheets

US 8,356,550 B2

PISTON SKIRT WITH FRICTION REDUCING OIL RECESS AND OIL RESERVOIR

CROSS REFERENCE TO RELATED APPLICATION

This application claims the benefit of application Ser. No. 61/083,768, filed Jul. 25, 2008, and application Ser. No. 61/098,912, filed Sep. 22, 2008, the disclosures of both of which are incorporated herein by reference.

BACKGROUND OF THE INVENTION

1. Field of the Invention

This invention relates to pistons for internal combustion engines, and in particular to pistons having features for reducing function and slap noise between the piston skirt and cylinder.

2. Description of the Prior Art

During an internal combustion engine cycle, undesirable friction and slap noise often occurs between a reciprocating piston and wall of the cylinder. Typically, as the speed of the engine increases, friction between the piston skirt and cylinder also increases. As a result of the friction, contact marks form on the piston skirt. Various approaches have been taken in an effort to reduce friction and slap noise, including applying low friction coatings to the piston skirt, changing the shape of the skirt, supplying oil to the outer surface of the piston, and including oil grooves in the piston skirt for containing the supplied oil. An example of such a piston including an oil grove is disclosed in the U.S. Pat. No. 7,086,152, assigned to Federal-Mogul Bradford Limited. Although helpful in reducing friction, these approaches have not eliminated the problem of friction and slap noise.

SUMMARY OF THE INVENTION AND ADVANTAGES

The piston includes a piston body extending along a longitudinal axis. The piston body includes a pair of pin bosses with pin bores aligned along a pin bore axis. The pin bore axis extends transverse to the longitudinal axis. The piston body also includes a piston skirt having an outer surface with a convex profile in the circumferential direction of the piston skirt. The outer surface of the piston skirt includes at least one oil reservoir disposed above the pin bore axis and at least one oil recess disposed below the pin bore axis. The oil recess is spaced longitudinally from the oil reservoir by an intervening oil spreading area of the piston skirt. The at least one oil recess and at least one oil reservoir have radiused corners or edges at a transition between the outer surface of the piston skirt and at a bottom of the at least one oil reservoir and the at least one oil recess, such that the at least one oil reservoir and the at least one oil recess are free of sharp edges or corners.

The oil recess and oil reservoir are designed to contain oil and create desirable oil spreading patterns across the outer surface of the reciprocating piston skirt during the combustion engine cycle. The oil serves as a cushion to the outer surface, especially the high contact areas, like the intervening oil spreading area. The design of the oil recess and oil reservoir also provide for an even distribution of the oil over the outer surface. The oil spreading patterns provided by the piston reduce the friction and slap noise to a satisfactory level. Further, unlike existing pistons which provide for an increase in friction as the engine speed increases, the piston including the oil recess and oil reservoir creating the desirable oil spreading patterns provides for a decrease in the amount of friction between the outer surface and the cylinder as the engine speed increases.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
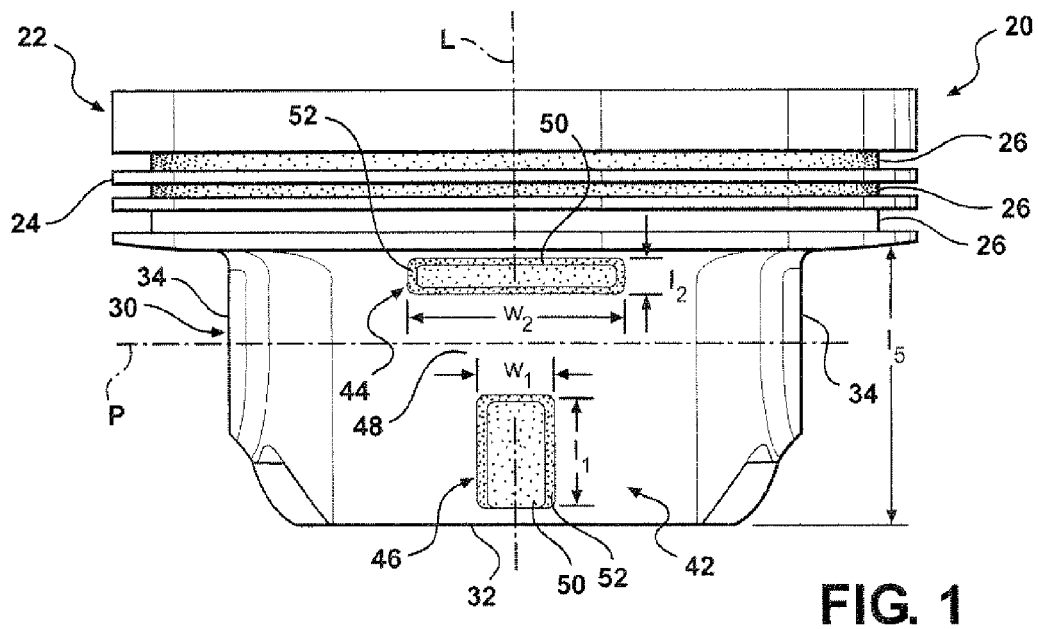
FIG. 1 is a side view of a piston having an outer surface including an oil recess and an oil reservoir.

Referring to the Figures, a piston 20 for use in an internal combustion engine is generally indicated. The piston 20 is typically employed in a four stroke, gasoline powered engine. The piston 20 includes a piston body 22 extending along a longitudinal axis L. The piston body 22 includes a ring belt 24 having an annular shape. The ring belt 24 includes a plurality of ring grooves 26, which can be cut into the ring belt 24. A piston ring 28 can be disposed in each of the ring grooves 26 in the usually manner. The piston body 22 can comprise the design shown in FIGS. 1-4, or other designs.

Figure 8:
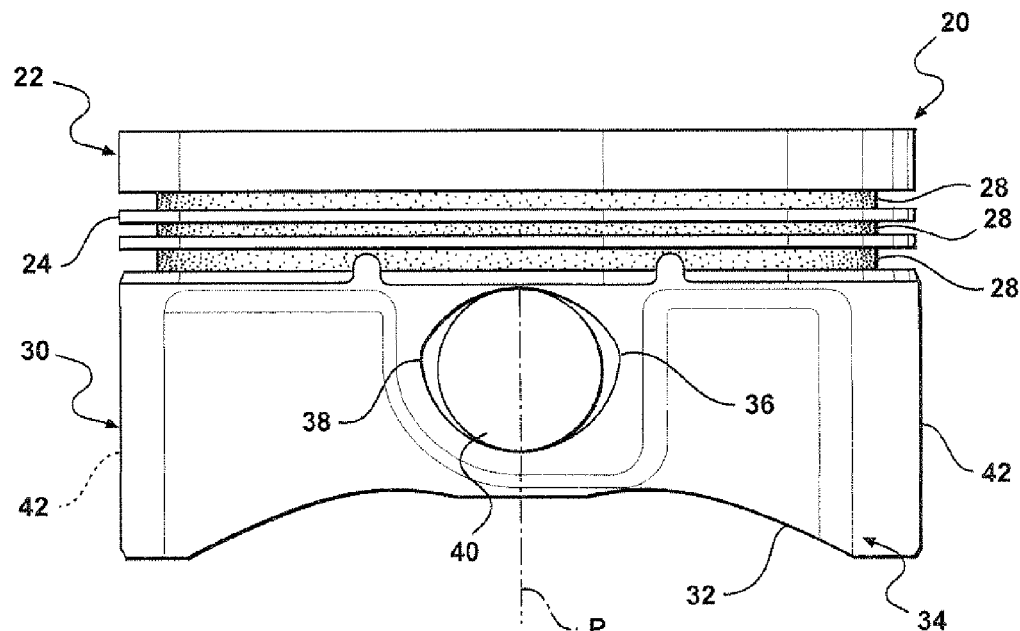
FIG. 8 is a side view of a piston showing a side including a pin boss portion and separating a pair of outer surfaces.

The piston 20 further comprises a piston skirt 30 extending a predetermined longitudinal skirt length $l_s$ from the ring belt 24 to a bottom end 32, as shown in FIG. 1. The piston 20 can be formed as one piece, or multiple pieces which may be joined together. The skirt length $l_s$, can be about 54 mm, or other lengths. The piston skirt 30 has a pair of sides 34 facing opposite one another and each extending from the ring belt 24 to the bottom end 32 of the piston skirt 30. The side 34 are typically identical to one another and each include a pin boss 36 with a pin bore 38, as shown in FIG. 8. The pin bore 38 is axially aligned along a pin bore axis P, which is transverse to the longitudinal axis L. The pin bores 38 can receive a wrist pin 40 in the usual manner, as shown in FIG. 8, for connecting the piston 20 to a connecting rod. The piston skirt 30 typically includes a surface roughness of about 12-18 Rz.

The piston skirt 30 includes a pair of outer surfaces 42, or skirt panels, facing opposite one another and separated from one another by the sides 34, as shown in FIG. 8. The outer surfaces 42 extend longitudinally from the ring belt 24 to the bottom end 32 of the piston skirt 30, as shown in FIGS. 1-4. The outer surfaces 42 each have a convex profile in the circumferential direction of the piston skirt 30, as shown in FIG. 5. The outer surfaces 42 are typically identical to one another and symmetrical about the longitudinal axis L.

Figure 9:
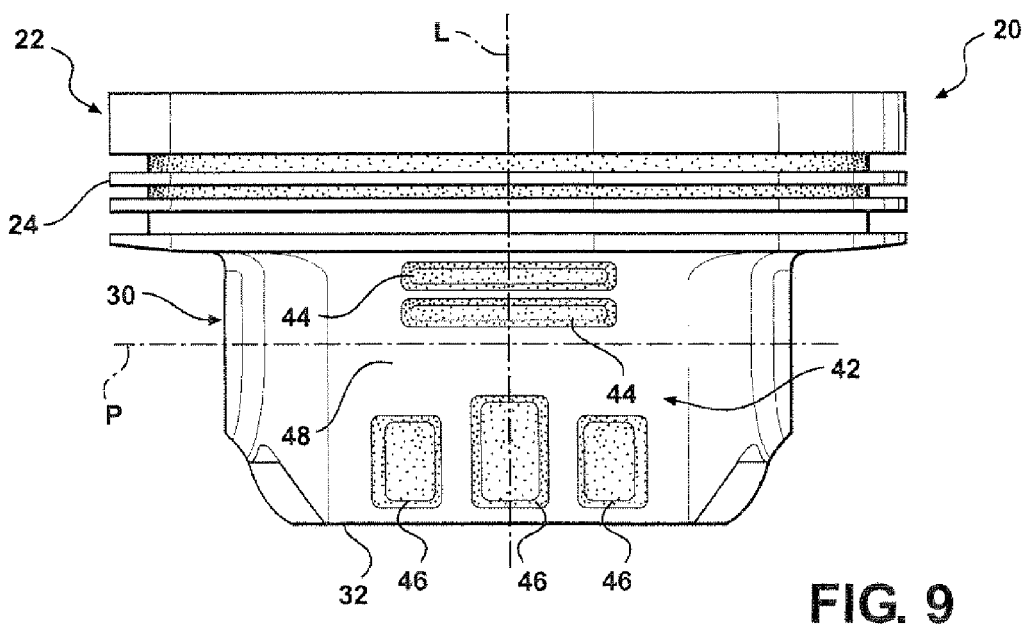
FIG. 9 is a side view of a piston including multiple oil reservoirs and multiple oil recesses.

Each of the outer surfaces 42 include at least one oil reservoir 44 above the pin bore axis P and at least one oil reservoir 44 below the pin bore axis P for containing oil during an engine cycle. Typically, each outer surface 42 includes one oil reservoir 44 and one oil recess 46, as shown in FIGS. 1-4, but can include multiple oil reservoirs 44, multiple oil recesses 46, or multiple oil reservoirs 44 and oil recesses 46, as shown in FIG. 9. The oil recess 46 is spaced longitudinally from the oil reservoir 44 by an intervening oil spreading area 48 of the piston skirt 30, as shown in FIGS. 1-4. In other words, the oil spreading area 48 is separate from the oil reservoirs 44 and oil recesses 46.

The oil recess 46 and oil reservoir 44 each include a bottom 50 extending over an area of the outer surface 42 and having a rectangular shape. The bottoms 50 each have a bottom depth $d_b$ between about 10 microns and about 50 microns, but typically about 35 microns. Typically, the bottom depths $d_b$ are approximately uniform throughout the corresponding area having the rectangular shape, as shown in FIG. 5. Also, the bottom depth $d_b$ of the oil reservoir 44 can be greater than the bottom depth $d_b$ of the oil recess 46, also shown in FIG. 5, so that the oil reservoir 44 can contain more oil than the oil recess 46.

Figure 6A:
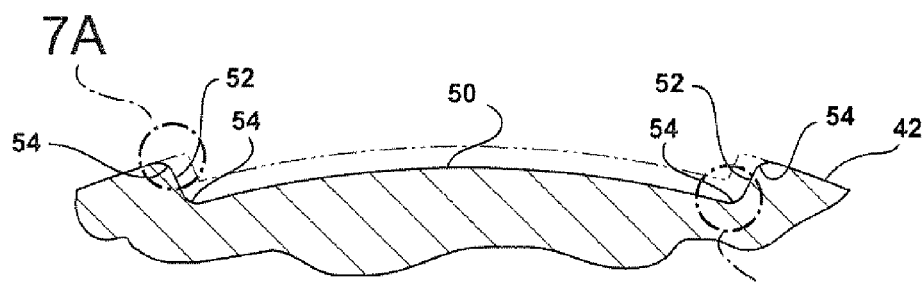
FIG. 6A is an enlarged and fragmented cross sectional top view of the oil reservoir shown in FIG. 3 taken along line 6A-6A wherein the prior art is shown in phantom lines.
Figure 6B:
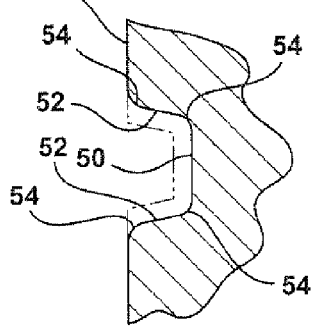
FIG. 6B is an enlarged and fragmented cross sectional top view of the oil reservoir shown in FIG. 3 taken along line 6B-6B wherein the prior art is shown in phantom lines.
Figure 7A:
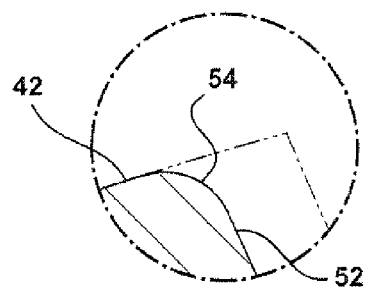
FIG. 7A is a greatly exaggerated and fragmented cross sectional top view of a radiused corner between the outer surface and oil reservoir shown in FIG. 6A wherein the prior art is shown in phantom lines.
Figure 7B:
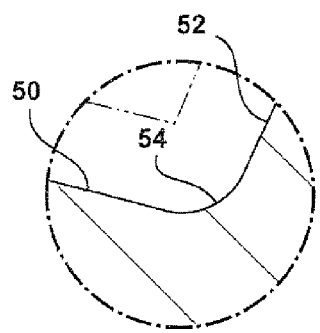
FIG. 7B is a greatly exaggerated and fragmented cross sectional top view of a radiused corner between a ramp side wall and bottom of the oil reservoir shown in FIG. 6A wherein the prior aid is shown in phantom lines.

The oil recess 46 and oil reservoir 44 also include ramped side walls 52 transitioning to the outer surface 42 and to the bottoms 50. The ramped side walls 52 can surround the entire bottom 50, or a portion of the bottom 50. The ramped side walls 52 have a ramp depth $d_r$, which typically decreases from the bottom (50) to the outer surface 42, as shown in FIG. 6B.

The oil recess 46 and oil reservoir 44 have radiused corners 54 or edges at a transition between the outer surface 42 of the piston skirt 30 and at the bottoms 50. The ramped side walls 52 transition to the outer surface 42 of the piston skirt 30 and to the bottoms 50 of the oil reservoir 44 and oil recess 46 by the radiused corners 54. In other words, the oil reservoir 44, oil recess 46, and outer surface 42 are free of sharp edges or corners. The design of the outer surface 42, oil reservoir 44, and oil recess 46 allow oil to flow smoothly into and out of the oil recess 46 and oil reservoir 44, and spread evenly over the outer surface 42.

Figure 2:
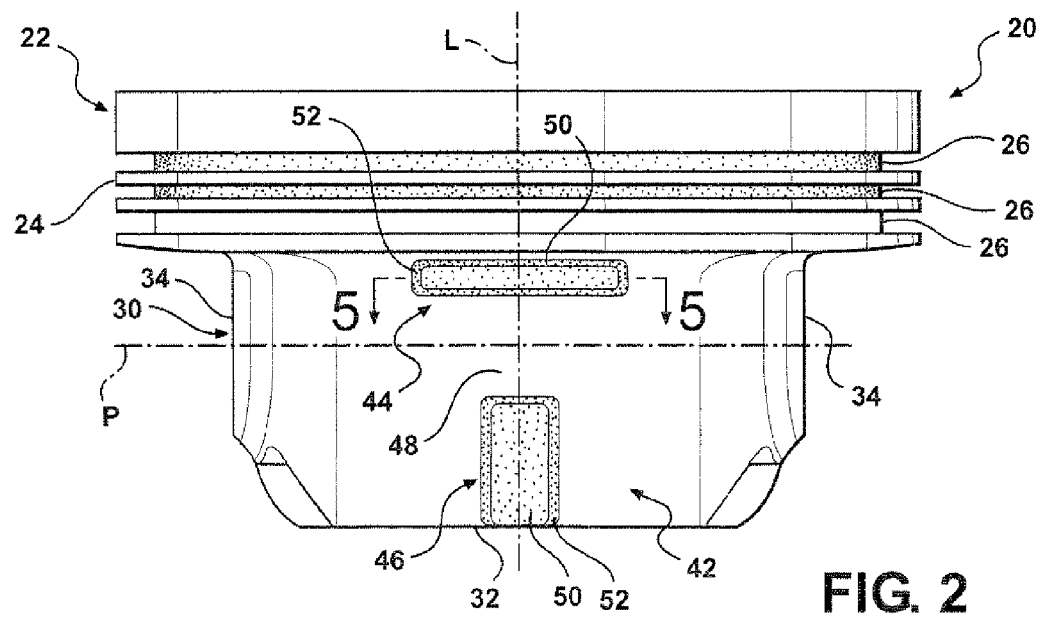
FIG. 2 is a side view of a piston having an outer surface including an oil recess and an oil reservoir wherein the oil recess includes an open side.
Figure 3:
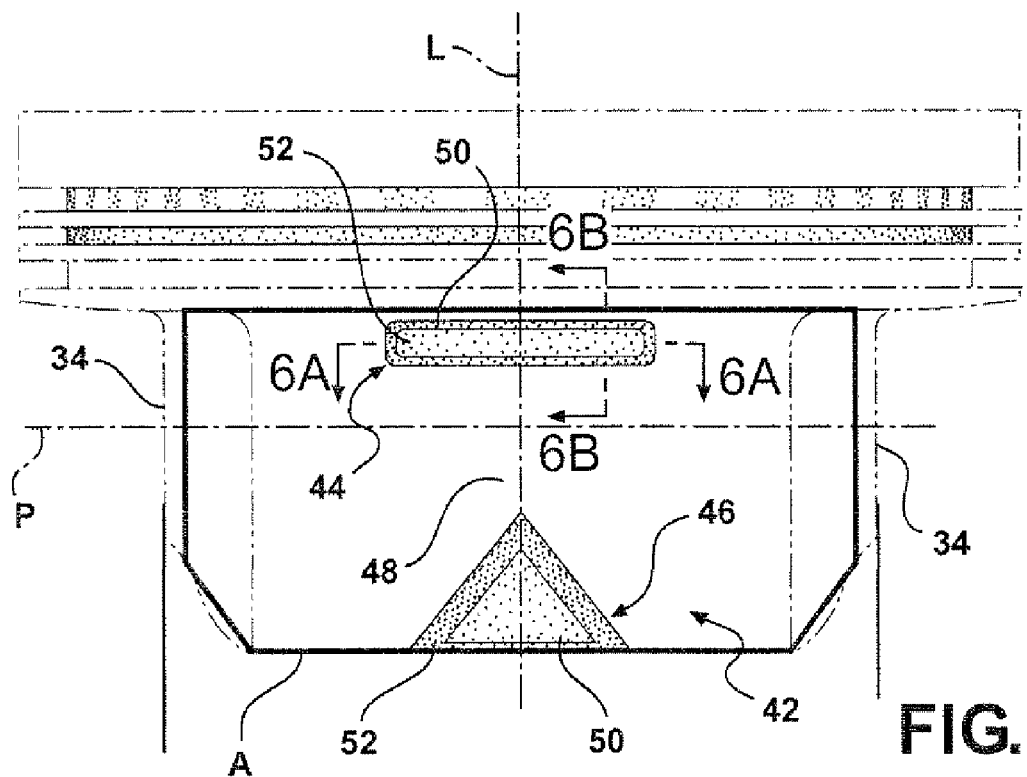
FIG. 3 is a side view of an outer surface of a piston skirt having a predetermined surface area, an oil reservoir, an oil recess having a triangular shape.
Figure 4A:
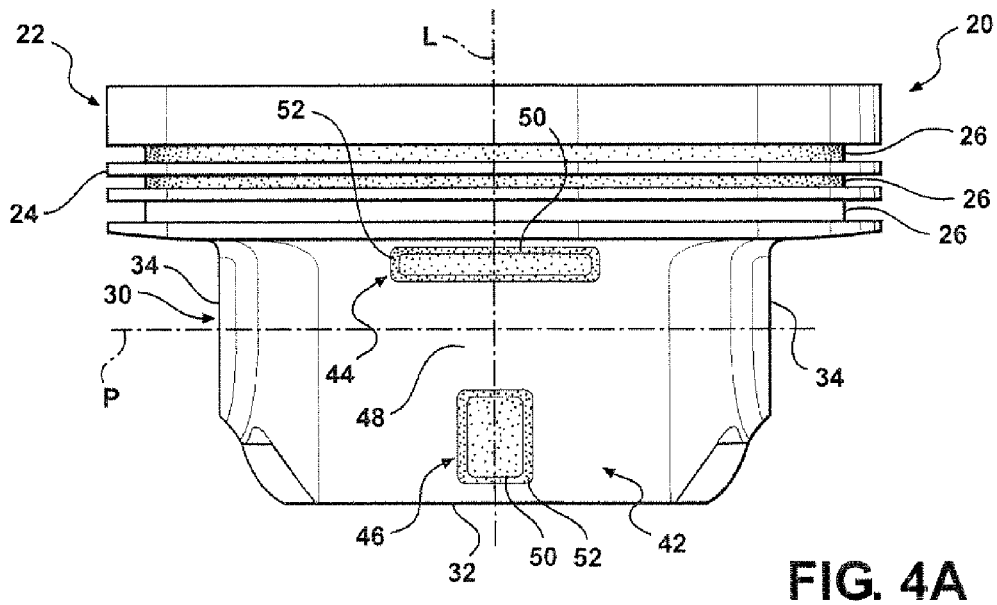
FIG. 4 is a side view of a pair of outer surfaces of a piston wherein an oil recess and an oil reservoir on one of the outer surfaces together extend over a smaller area than the oil recess and oil reservoir on the other outer surface.
Figure 4B:
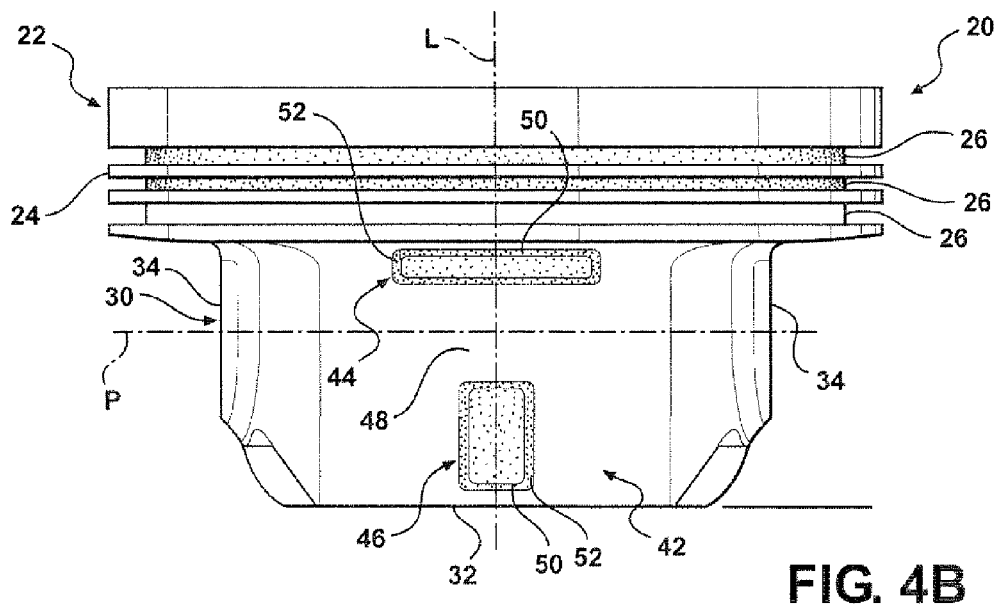
Figure 5:
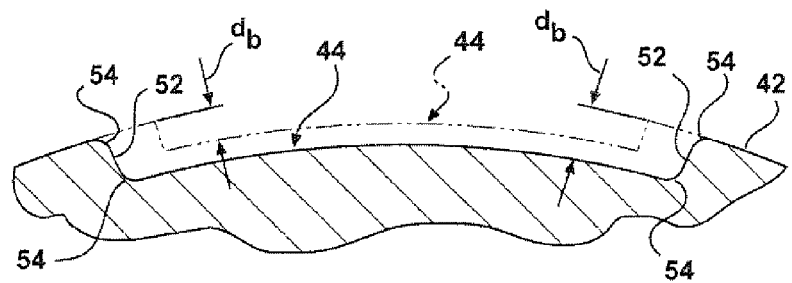
FIG. 5 is an enlarged and fragmented cross sectional top view of an oil reservoir of the piston shown in FIG. 2 taken along line 5-5 wherein a bottom depth of the oil reservoir is greater than a bottom depth of the oil recess.

The oil reservoir 44 and oil recess 46 typically comprise a rectangular shape, as shown in FIGS. 1, 2, and 4. In an alternate embodiment, the oil recess 46 can comprise a triangular shape, as shown in FIG. 3, but the oil recess 46 and oil reservoir 44 can be other shapes. The oil reservoir 44 and oil recess 46 are typically symmetrical about the longitudinal axis L, as shown in FIGS. 1-4, but can be asymmetrical about the axis, or elsewhere on the outer surface. The oil recess 46 has a recess length $l_1$ and a recess width $w_1$ and the oil reservoir 44 has a reservoir length $l_2$ and a reservoir width $w_2$. The recess length $l_1$ can be greater than the reservoir length $l_2$, and the recess width $w_1$ can be less than the reservoir width $w_2$, as shown in FIGS. 1, 2, and 4.

The oil reservoir 44 and oil recess 46 are typically about equal in area, as shown in FIGS. 1-4. One of the outer surfaces 42 of the piston skirt 30 can have a predetermined surface area A as shown by the solid lines in FIG. 3, and together the oil reservoir 44 and oil recess 46 typically comprise about one third (⅓) of the predetermined surface area A, also shown in FIG. 3. However, the oil recess 46 and oil reservoir 44, or multiple oil recesses 46 and oil reservoirs 44 can have areas different from one another, and together can comprise an area greater or less than one third of the predetermined surface area A.

The oil spreading area 48 typically spaces the oil reservoir 44 and oil recess 46 from one another by approximately fifty percent (50%) or approximately fifty five percent (55%) of the predetermined skirt length $l_s$. However, the oil spreading area 48 can space the oil recess 46 and oil reservoir 44, or the multiple oil recesses 46 and oil reservoirs 44, by other distances. Typically, the oil reservoir 44 is located closer to the ring belt 24 than to the pin bore axis P, as shown in FIGS. 1-4. In an alternate embodiment, part of the oil recess 46 can be disposed along the bottom end 32 of the piston skirt 30, as shown in FIGS. 2 and 3, such that the oil recess 46 has an open side 34 along the bottom end 32 piston skirt 30, not surrounded by the ramped side walls 52 or outer surface 42.

In one embodiment, the piston skirt 30 can include the at least one oil reservoir 44 and the at least one oil recess 46 on only one of the outer surfaces 42 of the piston skirt 30, for example, only on the thrust side 34. In yet another embodiment, the oil recess 46 and oil reservoir 44 can together cover a larger area on the thrust side 34 of the piston 20 than on the non-thrust side 34, as shown in FIG. 4, so that different oil spreading patterns can be produced on each outer surface 42. The piston skirt 30 may or may not include a low friction coating, as shown in FIG. 5, and if included, the coating may or may not be applied to the oil recess 46 and oil reservoir 44.

As alluded to above, during an engine cycle, friction and skirt slap noise often occur between the reciprocating piston 20 and inside wall of the cylinder, especially on the thrust side of the piston 20. The oil recess 46 and oil reservoir 44 are designed to provide a thick oil film over the outer surfaces 42 of the piston skirt 30. The oil can have a uniform thickness and act as a hydraulic cushion over the outer surface 42. As the oil moves between the oil recess 46 and oil reservoir 44, and spreads across the outer surface 42, it can form patterns extending over the entire outer surface 42. In other words, every section of the outer surface 42 can be protected from friction by the oil. The oil spreading patterns created on the outer surface 42 can reduce friction and slap noise between the piston skirt 30 and wall of the cylinder.

Specifically, during the downward power stroke of the engine, oil contained in the oil recess 46 can spread upward over the oil spreading area 48 of the outer surface 42, where a significant amount of friction occurs. Oil spreading over the oil spreading area 48 can feed into the oil reservoir 44. On the upward power stroke, oil contained in the oil reservoir 44 can spread downward over the oil spreading area 48 and into the oil recess 46. As the piston 20 reciprocates, desirable oil spreading patterns are produced on the outer surface 42. As a result of the improved design, another advantage is that as the speed of the engine increases, the amount of friction between the piston skirt 30 and wall of the cylinder decreases.

The dimensions of the oil reservoir 44 and oil recess 46 can be adjusted to best accommodate the amount and location friction on the outer surface 42. For example, on the thrust side 34 of the piston 20, friction occurring between the outer surface 42 of the piston skirt 30 and cylinder, which occurs during the downward stroke, can be greater and in a slightly different location than the friction occurring on the non-thrust side 34, which occurs during the upward stroke. Thus, the oil reservoir 44 and oil recess 46 can be designed to cover a larger area for containing more oil on the thrust side 34 than the non-thrust side 34, as shown in FIG. 4.

The oil reservoir 44 and oil recess 46 can be formed by a linear motor camless oval turning machine. The turning machine can include a digital controller having a control algorithm which can be programmed and changed depending on the size of the piston 20 and the desired dimensions of the oil recesses 46 and oil reservoirs 44. Further, the oil recesses 46 and oil reservoirs 44 can be incorporated into the piston skirt 30 during the same manufacturing process as the manufacturing of the piston 20.

Obviously, many modifications and variations of the present invention are possible in light of the above teachings and may be practiced otherwise than as specifically described while within the scope of the appended claims. These recitations should be interpreted to cover any combination in which the inventive novelty exercises its utility. In addition, the reference numerals in the claims are merely for convenience and are not to be read in any way as limiting.

ELEMENT LIST

| Element Symbol | Element Name |
| --- | --- |
| 20 | piston |
| 22 | piston body |
| 24 | ring belt |
| 26 | ring grooves |
| 28 | piston ring |
| 30 | piston skirt |
| 32 | bottom end |
| 34 | sides |
| 36 | pin bosses |
| 38 | pin bore |
| 40 | wrist pin |
| 42 | outer surface |
| 44 | oil reservoir |
| 46 | oil recess |
| 48 | oil spreading area |
| 50 | bottom |
| 52 | ramped side walls |
| 54 | radiused corners |
| A | predetermined surface area |
| $d_b$ | bottom depth |
| $d_r$ | ramp depth |
| L | longitudinal axis |
| $l_1$ | recess length |
| $l_2$ | reservoir length |
| $l_s$ | skirt length |
| P | pin bore axis |
| $w_1$ | recess width |
| $w_2$ | reservoir width |

The invention claimed is:

1. A piston (20) for an internal combustion engine comprising:
    a piston body (22) extending along a longitudinal axis (L) having a pair of pin bosses (36) with pin bores (38) aligned along a pin bore axis (P) that is transverse to said longitudinal axis (L), and a piston skirt (30) having an outer surface (42) with a convex profile in the circumferential direction of said piston skirt (30);
    said outer surface (42) of said piston skirt (30) including at least one oil reservoir (44) disposed above said pin bore axis (P) and at least one oil recess (46) disposed below said pin bore axis (P) and spaced longitudinally from said at least one oil reservoir (44) by an intervening oil spreading area (48) of said piston skirt (30); and
    wherein said at least one oil reservoir (44) and said at least one oil recess (46) have radiused corners (54) or edges at a transition between said outer surface (42) of said piston skirt (30) and at a bottom (50) of said at least one oil reservoir (44) and said at least one oil recess (46), such that said at least one oil reservoir (44) and said at least one oil recess (46) are free of sharp edges or corners.

2. The piston (20) of claim 1, wherein said at least one oil reservoir (44) and said at least one oil recess (46) have ramped side walls (52) that transition to said outer surface (42) of said piston skirt (30) and said bottoms (50) of said at least one oil reservoir (44) and said at least one oil recess (46) by said radiused corners (54).

3. The piston (20) of claim 2, wherein said ramped side walls (52) have a ramp depth ($d_r$) decreasing from said bottoms (50) to said outer surface (42).

4. The piston (20) of claim 1, wherein said bottoms (50) of said at least one oil reservoir (44) and said at least one oil recess (46) each have a bottom depth ($d_b$) between about 10 microns and about 50 microns.

5. The piston (20) of claim 1, wherein said bottoms (50) of said at least one oil reservoir (44) and said at least one oil recess (46) each have a bottom depth ($d_b$), and said bottom depth ($d_b$) of said at least one oil reservoir (44) is greater than said bottom depth ($d_b$) of said at least one oil recess (46).

6. The piston (20) of claim 1, wherein said at least one oil reservoir (44) and said at least one oil recess (46) are approximately equal in area.

7. The piston (20) of claim 1, wherein said outer surface (42) has a predetermined surface area (A), and said at least one oil reservoir (44) and said at least one oil recess (46) together extend over approximately one third of said predetermined surface area (A).

8. The piston (20) of claim 1, wherein said each of said oil recesses (46) have a recess length ($l_1$) and a recess width ($w_1$), and each of said oil reservoirs (44) have a reservoir length ($l_2$) and a reservoir width ($w_2$), and said recess lengths ($l_1$) are greater than said reservoir lengths ($l_2$), and said recess widths ($w_1$) are less than said reservoir widths ($W_2$).

9. The piston (20) of claim 1, wherein said piston skirt (30) has a predetermined longitudinal skirt length ($l_s$), and said at least one oil reservoir (44) and said at least one oil recess (46) are spaced from one another by approximately fifty percent (50%) of said predetermined longitudinal skirt length ($l_s$).

10. The piston (20) of claim 1, wherein said at least one oil recess (46) is located closer to a bottom end (32) of said piston skirt (30) than to said pin bore axis (P).

11. The piston (20) of claim 1, wherein said at least one oil reservoir (44) is located closer to a top end of said piston skirt (30) than to said pin bore axis (P).

12. The piston (20) of claim 1, wherein said at least one oil recess (46) is disposed at least in part along a bottom end (32) of said piston skirt (30).

13. The piston (20) of claim 1, wherein said convex profile of said outer surface (42) and said at least one oil reservoir (44) and said at least one oil recess (46) are symmetrical about said longitudinal axis (L).

14. A piston (20) as set forth in claim 1, wherein each of said bottoms (50) of said at least one oil reservoir (44) and said at least one oil recess (46) extend over an area of said outer surface (42) having a rectangular shape.

15. A piston (20) as set forth in claim 1, wherein each of said bottoms (50) of said at least one oil reservoir (44) and said at least one oil recess (46) extend over an area of said outer surface (42) having a triangular shape.

16. A piston (20) as set forth in claim 1, wherein said piston skirt (30) includes a pair of said outer surfaces (42) facing opposite one another and each including said at least one oil reservoir (44) and said at least one oil recess (46).

17. A piston (20) as set forth in claim 16, wherein said at least one oil reservoir (44) and said at least one oil recess (46) on one of said outer surfaces (42) together extend over a smaller area than said at least one oil reservoir (44) and said at least one oil recess (46) on the other outer surface (42).

18. A piston (20) as set forth in claim 1, wherein said radiused corners (54) or edges completely surround said bottom (50) of said at least one oil reservoir (44) and said at least one oil recess (46).

19. A piston (20) for an internal combustion engine comprising:
   a piston body (22) extending along a longitudinal axis (L),
   said piston body (22) including a ring belt (24) having a plurality of ring grooves (26) comprising an annular shape,
   a piston ring (28) disposed in each of said ring grooves (26),
   said piston body (22) including a piston skirt (30) extending a predetermined longitudinal skirt length ($l_s$) from said ring belt (24) to a bottom end (32),
   said piston skirt (30) having a pair of sides (34) including pin bosses (36) with pin bores (38) aligned along a pin bore axis (P) that is transverse to said longitudinal axis (L),
   said piston skirt (30) including a pair of outer surfaces (42) facing opposite one another and separated from one another by said sides (34) of said piston body (22),
   each of said outer surfaces (42) comprising a convex profile in the circumferential direction of said piston skirt (30),
   said convex profiles of each of said outer surfaces (42) being symmetrical about said longitudinal axis (L),
   each of said outer surfaces (42) of said piston skirt (30) including at least one oil reservoir (44) disposed above said pin bore axis (P) and at least one oil recess (46) disposed below said pin bore axis (P) and spaced longitudinally from said oil reservoir (44) by an intervening oil spreading area (48) of said piston skirt (30),
   said at least one oil reservoir (44) and said at least one oil recess (46) each including a bottom (50) extending over an area of said outer surface (42) and having a rectangular shape,
   said bottom having a bottom depth ($d_b$) between about 10 microns and about 50 microns,
   said bottom depths ($d_b$) being approximately uniform throughout said corresponding area having a rectangular shape,
   said bottom depth ($d_b$) of said at least one oil reservoir (44) being greater than said bottom depth ($d_b$) of said at least one oil recess (46),
   said at least one oil reservoir (44) and said at least one oil recess (46) having radiused corners (54) or edges at a transition between said outer surface (42) of said piston skirt (30) and at said bottoms (50) of said at least one oil reservoir (44) and said at least one oil recess (46), such that said at least one oil reservoir (44) and said at least one oil recess (46) are free of sharp edges or corners,
   said at least one oil reservoir (44) and said at least one oil recess (46) having ramped side walls (52) transitioning to said outer surface (42) of said piston skirt (30) and said bottoms (50) of said at least one oil reservoir (44) and said at least one oil recess (46) by said radiused corners (54),
   said ramped side walls (52) having a ramp depth ($d_r$) decreasing from said bottom (50) to said outer surface (42),
   said at least one oil reservoir (44) and said at least one oil recess (46) being symmetrical about said longitudinal axis (L),
   each of said oil recesses (46) having a recess length ($l_1$) and a recess width ($w_1$),
   each of said oil reservoirs (44) having a reservoir length ($l_2$) and a reservoir width ($w_2$),
   said recess length ($l_1$) being greater than said reservoir length ($l_2$),
   said recess width ($w_1$) being less than said reservoir width ($w_2$),
   said at least one oil reservoir (44) and said at least one oil recess (46) extending over approximately equally sized areas of said outer surface (42),
   said intervening oil spreading area (48) longitudinally spacing said at least one oil reservoir (44) and said at least one oil recess (46) from one another by approximately fifty percent (50%) of said predetermined longitudinal skirt length ($l_s$),
   said at least one oil recess (46) being located closer to said bottom end (32) than to said pin bore axis (P), and
   said at least one oil reservoir (44) being located closer to said ring belt (24) than to said pin bore axis (P).

* * * * *